United States Patent [19]
Rochat

[11] 4,166,696
[45] Sep. 4, 1979

[54] PHOTOMETER

[75] Inventor: Charles L. Rochat, Veyrier, Switzerland

[73] Assignee: Pignons S.A., Ballaigues, Switzerland

[21] Appl. No.: 792,495

[22] Filed: Apr. 29, 1977

[30] Foreign Application Priority Data

May 4, 1976 [CH] Switzerland ............... 5542/76

[51] Int. Cl.² .................... G01J 1/42; G03B 7/00
[52] U.S. Cl. ...................... 356/223; 356/226; 354/60 A
[58] Field of Search ............ 356/223, 226, 229; 354/23 D, 24, 60 A, 50, 51

[56] References Cited

U.S. PATENT DOCUMENTS

| 3,843,265 | 10/1974 | Egli et al. | 356/223 |
| 3,882,510 | 5/1975 | Nobusawa | 354/24 |
| 3,992,098 | 11/1976 | Wirtz | 354/60 A X |

FOREIGN PATENT DOCUMENTS 2243824 3/1974 Fed. Rep. of Germany ............ 354/24

Primary Examiner—Rolf G. Hille
Attorney, Agent, or Firm—Emory L. Groff, Jr.

[57] ABSTRACT

A photometer for providing a measurement of shutter speed or aperture setting corresponding to a preselected value of the other comprises a photodiode supplying a voltage proportional to the logarithm of the measured light intensity. This voltage controls the frequency of an oscillator supplying pulses to a counting circuit during a time interval set by a timer.

3 Claims, 1 Drawing Figure

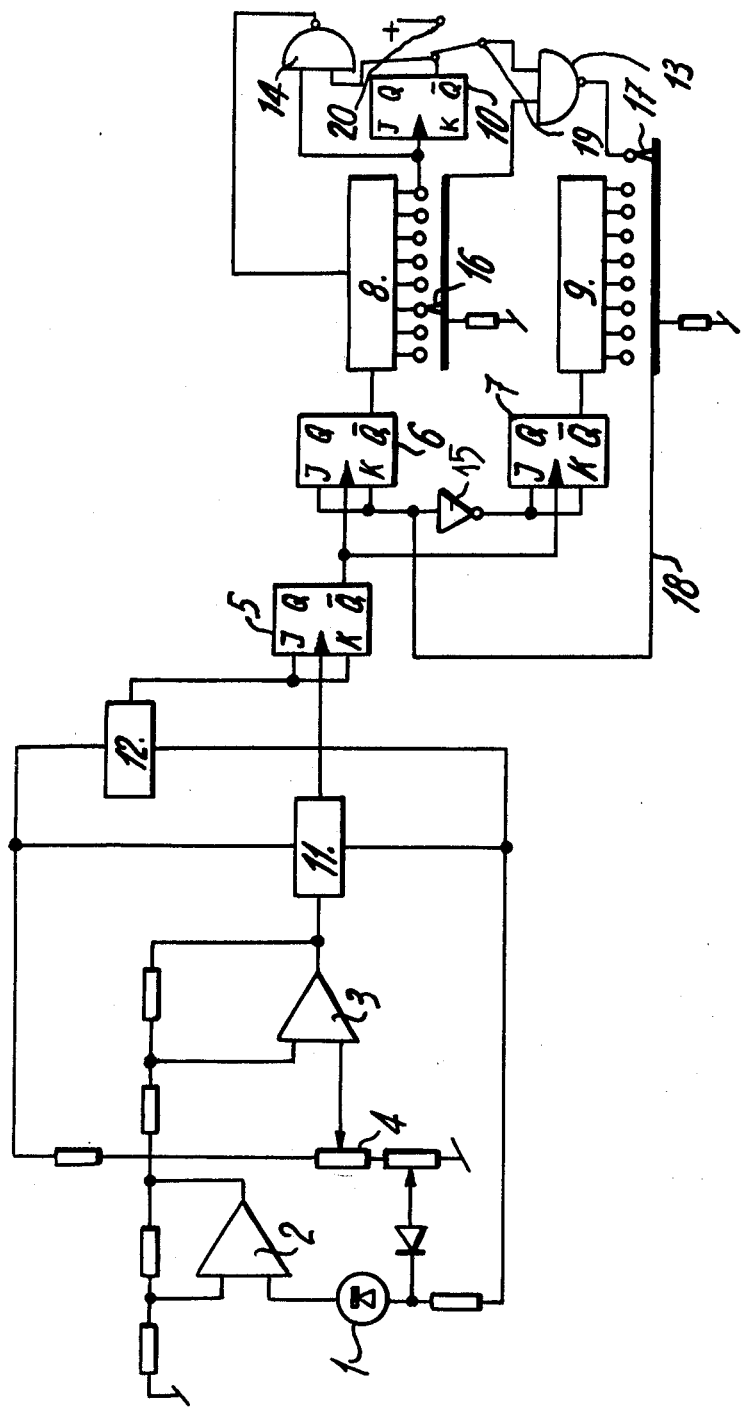

PHOTOMETER

The invention relates to photometers of the type comprising at least one photoelectric element which in use is exposed to light whose intensity is to be measured, and means for supplying to a counting circuit a number of pulses representing the light intensity.

Such photometers are well known in the art and are notably used in photography to evaluate the exposure time and the diaphragm aperture setting before taking a photograph or a cinematographic film. They comprise an oscillator supplying, during a time interval determined as a function of the light intensity, a number of pulses representing this intensity.

For example, W. German Pat. Specification (DT) No. 2,531,858 published Feb. 5, 1976, proposed an apparatus for measuring light intensity by means of a photoresistor associated with a time-delay circuit to provide a time interval proportional to the illumination. During this time interval, the time-delay circuit disinhibits an oscillator whose frequency can be set as a function of the chosen aperture setting.

Such an arrangement requires numerous electronic components having appreciable tolerances. A setting of each apparatus thus proves necessary if one wishes to obtain precise indications when measuring a scene to be photographed.

The invention aims to provide a photometer which is simple to assemble, advantageously requires no regulation to account for the tolerances of the components and has a great measuring sensitivity.

A photometer according to the invention is characterized in that it comprises:

(a) a photodiode supplying a voltage proportional to the logarithm of the light intensity;
(b) an oscillator the frequency of which is controlled by said voltage; and
(c) timing means allowing passage of the pulses of the oscillator to the counting circuit during a predetermined fixed time.

The accompanying drawing shows, by way of example, an embodiment of the invention, the single FIGURE being an electric circuit diagram thereof.

The apparatus shown comprises a silicon photodiode 1 connected to a lead-in of an amplifier 2 having a high input impedance, of the order of 1000 megohm. The photodiode 1 receives the light diffused by an object to be photographed and supplies a voltage which increases linearly as a function of the logarithm of its illumination. This function is very advantageous as it practically coincides with the exposure curve of photographic films.

The output voltage of amplifier 2 is delivered to one lead-in of a differential amplifier 3 whose other lead-in is connected to a potentiometer 4 providing a voltage fixed as a function of the sensitivity of the photographic film used.

The output voltage of amplifier 3 is used to control the frequency of pulses supplied by an oscillator 11, the frequency of this oscillator being a linear function of its input voltage.

By using integrated amplifying elements, the regulations due to tolerance are eliminated. Moreover, one obtains a direct conversion of the amplified voltage supplied by the photodiode 1 to a frequency directly proportional to the logarithm of the measured light intensity.

The pulses of oscillator 11 are delivered to a binary counter (divider by two) in the form of a JK type flip-flop 5 to enable the determination of half-diaphragms. A timer 12 determines the time interval during which division takes place, the lead-out of timer 12 being connected to the lead-ins J and K of flip-flop 5.

The pulses supplied by flip-flop 5 are simultaneously supplied to two similar flip-flops 6 and 7, and the output pulses of flip-flops 6 and 7 are delivered to respective counters 8 and 9.

The different states of counter 8 correspond for example to the various possible shutter speeds and those of counter 9 to the possible diaphragm aperture settings.

Each counter 8, 9 may be manually pre-selected by known means, not shown.

In the drawing, each counter is shown as having eight lead-outs which are connected by a respective mobile bridge 16, 17 to a control line 18 of the flip-flops 6 and 7.

The last lead-out of counter 8 is connected to a JK type flip-flop 10 whose lead-out $\overline{Q}$ is connected on the one hand, via a switch 19, to one of two lead-ins of a NAND gate 13 and on the other hand to one of two lead-ins of another NAND gate 14. The switch 19 enables the former connection to be broken, so that this lead-in of gate 13 is connected to a terminal 20 at level "1". The last lead-out of counter 8 is also directly connected to the other lead-in of gate 14 and the lead-out of gate 14 is connected to the zero-setting lead-in of counter 8. The lead-out of counter 8 preselected by mobile bridge 16 is connected to the second lead-in of gate 13. The lead-out of gate 13 may, as shown, be connected by the mobile bridge 17 to the control line 18 when the mobile bridge 17 is not connected to one of the lead-outs of counter 9. The control line 18 leads directly to the lead-ins J and K of flip-flop 6 and, via an inverter (negator) 15, to the lead-ins J and K of flip-flop 7.

In operation, when the user desires to take a photograph at a given shutter speed, he pre-selects the counter 8 at the corresponding value. This involves bringing the mobile bridge 16 into contact with one of the lead-outs of counter 8, this lead-out having a "0" output until the preselected value has been reached. Also, the mobile bridge 17 is set as shown to connect gate 13 directly to line 18. Then the user actuates a manual control to start the timer 12. From this moment, the pulses delivered by oscillator 11, and whose frequency is a function of the light intensity measured by photodiode 1, are delivered, after division of their frequency by four by means of the flip-flops 5 and 6, to the counter 8. The lead-out of gate 13 is at logic level "1" as one of its lead-ins is at "0" and the other is connected to terminal 20; consequently, the lead-ins J and K of flip-flop 6 are at "1" and those of flip-flop 7 at "0". Thus, only the flip-flop 6 can deliver the pulses.

When the counter 8 reaches the preselected value, it trips gate 13 so that flip-flop 6 is switched off and flip-flop 7 supplies pulses to counter 9. The value reaches by counter 9 at the end of the time set by timer 12 corresponds to the diaphragm aperture to be selected to obtain a correct exposure of the film.

If the user desires to photograph with a given aperture setting, the lead-out of counter 9 corresponding to this aperture setting is connected by the mobile bridge 17 directly to the flip-fop 6 and, via inverter 15, to the flip-flop 7. This lead-out is at "0" at the moment when the timer 12 is switched on and it is hence the flip-flop 6 which is off. The counter 9 thus counts the pulses until the preselected value. At this moment, the selected output of counter 9 changes state from "0" to "1" so that flip-flop 7 is switched off. The counter 8 then counts until the end of the time interval determined by timer 12. The value reached by counter 8 corresponds to the required shutter speed as a function of the selected aperture.

It is evident the means for displaying the values of the two counters should be provided if the setting of the camera is manual.

A possibility of selecting sixteen speeds is shown in the drawing. To this end, the switch 19 is placed to connect the lead-in of gate 13 to the lead-out $\overline{Q}$ of flip-flop 10, which lead-out is at "0" when the timer 12 is switched on if a speed greater than the lower eight speeds is desired (for the lower eight speeds, the lead-out $\overline{Q}$ of flip-flop 10 is at "1" when the timer 12 is switched on, so that the operation is as described above, when the switch 19 is connected to terminal 20). Hence, when the counter 8 reaches its maximum value, the lead-out of flip-flop 10 changes state (passes to "1"), a zero-setting pulse is given to counter 8 by gate 14, and the counter 8 continues to count, the subsequent operation being the same as described before.

Of course, a circuit for the general zero-setting of all of the circuits is provided (not shown), as is a display for the "overflow" of the counter(s).

An advantage of the described photometer resides in the possibility of being able, at will, to impose a given shutter speed or aperture-setting. In effect, the described circuit, starting from the imposed value, calculates the second parameter as a function of the light intensity measured by the photoelectric cell (photodiode), the number of pulses delivered by the oscillator 11 during the time interval defined by the timer 12 being a sum of the value representing the speed and aperture setting for a given light intensity.

The time constant of the timer 12 should be predetermined during assembly as a function of the maximum speed, the minimum speed and the maximum sensitivity of the films to be used.

I claim:

1. A photometer arrangement comprising a photodiode for supplying a voltage proportional to the logarithm of the light intensity, an oscillator the frequency of which is controlled by said voltage, timing means controlling passage of the pulses of the oscillator to a counting circuit for a predetermined fixed time, a differential amplifier connected to said oscillator and a manually controllable potentiometer connected to said differential amplifier and to said photodiode for controlling the frequency of the oscillator.

2. A photometer arrangement as claimed in claim 3, wherein the counting circuit comprises a first counter for controlling the shutter speed of a camera, a second counter for controlling the aperture of a camera, means for manually setting said first and second counters whereby initiation of operation of said timing means initiates operation of one of said counters.

3. A photometer arrangement comprising a photodiode to be exposed to light the intensity of which is to be measured, said photodiode providing a voltage proportional to the logarithm of said intensity, an oscillator the frequency of which is to be controlled by said voltage, a counting circuit, a timer permitting impulses from the oscillator to pass to said counting circuit during a predetermined interval of time for operation of the time exposure and the opening of the diaphram of a camera, said counting circuit comprising two counters, one controlling the time exposure and the other controlling the opening of said diaphragm, preselection means for each of said counters, said circuit being disposed in a manner such that the impulses are applied first to one of said preselection means and then to the other preselection means when the first one has attained a preselected value, and frequency divider means provided between the oscillator and the counting circuit.

* * * * *